E·BERHARD HARRSCH, OF NEW YORK, N. Y.

Letters Patent No. 88,291, dated March 30, 1869.

IMPROVEMENT IN THE MANUFACTURE OF COLORS AND PIGMENTS.

The Schedule referred to in these Letters Patent and making part of the same.

*To all whom it may concern:*

Be it known that I, EBERHARD HARRSCH, of New York, in the county of New York, and State of New York, have invented certain new and useful Improvements in the Manufacture of Colors; and I do hereby declare that the following is a full, clear, and exact description thereof, reference being had to the accompanying drawings, and to the letters of reference marked thereon, which form a part of this specification.

My invention, or discovery relates to the manufacture, or production of colors, in all their variety, from the Franklinite-ore.

This peculiar ore is, with great advantage, used for the production of zinc-white, and also for other useful purposes, but never, to my knowledge, have colors been extracted from it.

This idea I have practically carried out, resulting in all shades of color, any of which can be made, *ad libitum*, by the manufacturer.

The plentiful supply of soluble peroxide of iron, by the Franklinite-ore, and its prevalence in all shades of color, give the latter superiority over other paints.

My mixed shades will be particularly welcome to the new art of color-printing, dispensing, as I do, with the difficult way of mixing, and also avoiding the bad effects resulting from painting with shades of an unequal body. In this respect, my colors will be found essentially different from others, as they are all composed of the same material, and, consequently, have a uniformity of body.

The rare application of acids directly to ores, except for analytical purposes, is probably the reason why the ores in question have been worked for years in furnaces only. I knew, from their composition, they should yield to acids, and experimented upon them, with the result herein referred to.

I will now describe my process of extracting colors from the Franklinite-ore:

I take wooden tubs, or vats, lined with lead, in which a quantity of the broken ore may be placed. The ore is then covered with a mixture of one part of sulphuric acid, and from four to six parts of water, by measure, and the contents of the tub are kept heated, by use of steam, or otherwise, from 150° to 200°; and, after four or six hours, (or sooner, if the sulphuric acid is found to be almost neutralized,) the red liquor is drawn off, and kept for use, while the operation of dissolving, in the described way, is repeated, until all the metallic contents of the ore are extracted.

The precipitation is accomplished as follows:

For blue, by adding a solution of ferrocyanide of soda, or potash, to the red extract. If all is precipitated at once, the blue will have the lightest hue; but, if a part is first precipitated, and the remaining solution used a second time, the result will be a higher color.

For green, by adding a solution of chromate or bichromate of soda, or potash, to the blue precipitate, while the latter is suspended yet in the liquor, until the desired green is reached. As in the case before, if, first, blue is taken out of the solution in a small proportion, the remaining liquor gives, if worked for green, by adding ferrocyanide and chromate of potash again, another and different hue of green, as when all blue had been precipitated at once, and then shaded to green.

For yellow and brown, I precipitate the remaining liquor, after it is used for blue or green, with soda, or potash, and some chromate of potash. The former, prevailing, brings it more to brown; the latter, more to yellow.

If it is wanted, the solution of ore can be entirely worked out, either for blue, green, or yellow.

I have found that the residue in the furnaces, after the zinc-white has been separated therefrom, can be used as well for my purpose as the pure Franklinite-ore, or Franklinite, with red oxide of zinc, or the amorphous zinc-ore.

Any ore containing the oxides of zinc, manganese, and brown, can be worked up to colors by the above process.

Having thus described my invention, or discovery,

What I claim as new, and desire to secure by Letters Patent, is—

The extraction of colors, or dyes from Franklinite-ores, the residue thereof, or any other ore containing oxide of zinc, manganese, and iron, substantially as described.

In testimony that I claim the foregoing as my own, I affix my signature, in presence of two witnesses.

EBERH'D HARRSCH.

Witnesses:
ELIAS HEIL,
T. H. ALEXANDER.